United States Patent
Cheng et al.

(10) Patent No.: US 7,392,434 B2
(45) Date of Patent: Jun. 24, 2008

(54) LOGIC ANALYZER DATA PROCESSING METHOD

(75) Inventors: Chiu-Hao Cheng, Miaoli Hsien (TW); Ming-Gwo Cheng, Taichung Hsien (TW); Tsung-Chih Huang, Chungho (TW); Chun-Feng Tzu, Miaoli Hsien (TW)

(73) Assignee: Zeroplus Technology Co., Ltd., Chungho, Taipei Hsien (TW)

( * ) Notice: Subject to any disclaimer, the term of this patent is extended or adjusted under 35 U.S.C. 154(b) by 163 days.

(21) Appl. No.: 10/531,410

(22) PCT Filed: Oct. 21, 2002

(86) PCT No.: PCT/US02/31587

§ 371 (c)(1),
(2), (4) Date: Apr. 20, 2005

(87) PCT Pub. No.: WO2004/038589

PCT Pub. Date: May 6, 2004

(65) Prior Publication Data

US 2006/0143518 A1    Jun. 29, 2006

(51) Int. Cl.
*G06F 11/00* (2006.01)
(52) U.S. Cl. .............................. 714/39; 714/25; 714/30
(58) Field of Classification Search .................. 714/25, 714/30, 39
See application file for complete search history.

(56) References Cited

U.S. PATENT DOCUMENTS 6,360,340 B1 * 3/2002 Brown et al. ................ 714/718
6,467,053 B1 * 10/2002 Connolly et al. .............. 714/39

* cited by examiner

*Primary Examiner*—Yolanda L Wilson
(74) *Attorney, Agent, or Firm*—Bacon & Thomas, PLLC

(57) ABSTRACT

A logic analyzer data processing method used in a logic analyzer having a control circuit adapted to read in test data from a test sample, a memory controlled by the control circuit to store the test data received from the test sample, and a display adapted to display the test data fetched by the control circuit from the memory, the method including the step of enabling the control circuit to drive a compressor to compress the test data received form the test sample before storing it in the memory, and to decompress the compressed test data before transmitting it from the memory to the display.

22 Claims, 5 Drawing Sheets

LOGIC ANALYZER DATA PROCESSING METHOD

BACKGROUND OF THE INVENTION

1. Field of the Invention

The present invention relates to logic analyzers and, more specifically, to logic analyzer data processing method, which decompresses test data obtained from test samples before storing in memory so that memory can store more test data.

2. Description of the Related Art

FIG. 1 illustrates the arrangement of a logic data analyzer according to the prior art. The logic analyzer comprises a logic analyzer main unit 10'. The logic analyzer main unit 10' comprises detection devices 11'. Each detection device 11' has multiple lead-wires 111' and a clip 113' at the end of each lead-wire 111' for fastening to a respective pin of the test sample (for example, digital circuit). The detection devices 11' detect high/low potential status of every pin of the test sample at a fixed time interval, and then transmit test data to a computer 16' through a transmission interface (for example, USB interface, LPT interface, or the like) 15, enabling test data to be displayed on the display screen 161' of the computer 16'. FIG. 2 is a system block diagram of the prior art logic data analyzer. The logic analyzer main unit 10' comprises a control circuit 17' and a memory (for example, SRAM) 18'. When received test data from the test sample 13', the control circuit 17' stores received test data in the memory 18'. When the memory space of the memory 18' used up, the control circuit 17' fetches storage test data from the memory 18', and then transmits fetched test data to the computer 16' through the transmission interface 15' for display on the display screen 161' of the computer 16'. Because the memory 18' has a limited data storage space, it may not be able to store a complete series of test data. When the user debugging the digital circuit (test sample) based on an incomplete test result, the debugging work may take much time, or may be unable to proceed.

Therefore, it is desirable to provide a logic analyzer data processing method that eliminates the aforesaid problem.

SUMMARY OF THE INVENTION

The present invention has been accomplished under the circumstances in view. It is therefore the main object of the present invention to provide a logic analyzer data processing method, which compresses the test data obtained from the test sample before storing it in the memory, so that the test data can be stored in less space in the memory.

According to one aspect of the present invention, the logic analyzer data processing method is used in a logic analyzer having a control circuit adapted to read in test data from a test sample, a memory controlled by the control circuit to store the test data received from the test sample, and a display adapted to display the test data fetched by the control circuit from the memory, the method including the step of enabling the control circuit to drive a compressor to compress the test data before storing in the memory. According to another aspect of the present invention, the control circuit is controlled to drive the compressor to depress the compressed test data before transmitting it from the memory to the display.

DETAILED DESCRIPTION OF THE PREFERRED EMBODIMENT

Figure 1:
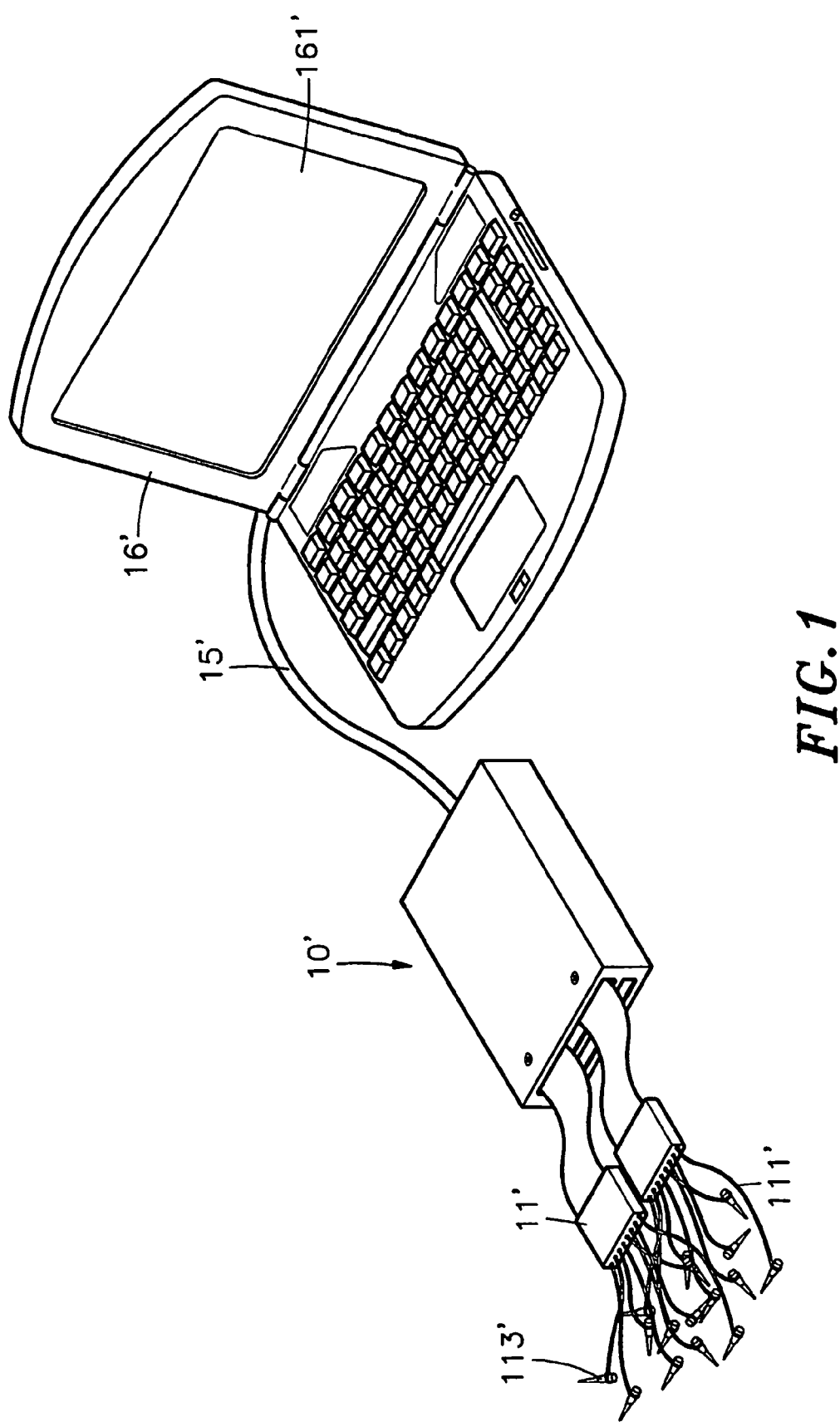
FIG. 1 illustrates the arrangement of a logic analyzer according to the prior art.
Figure 2:
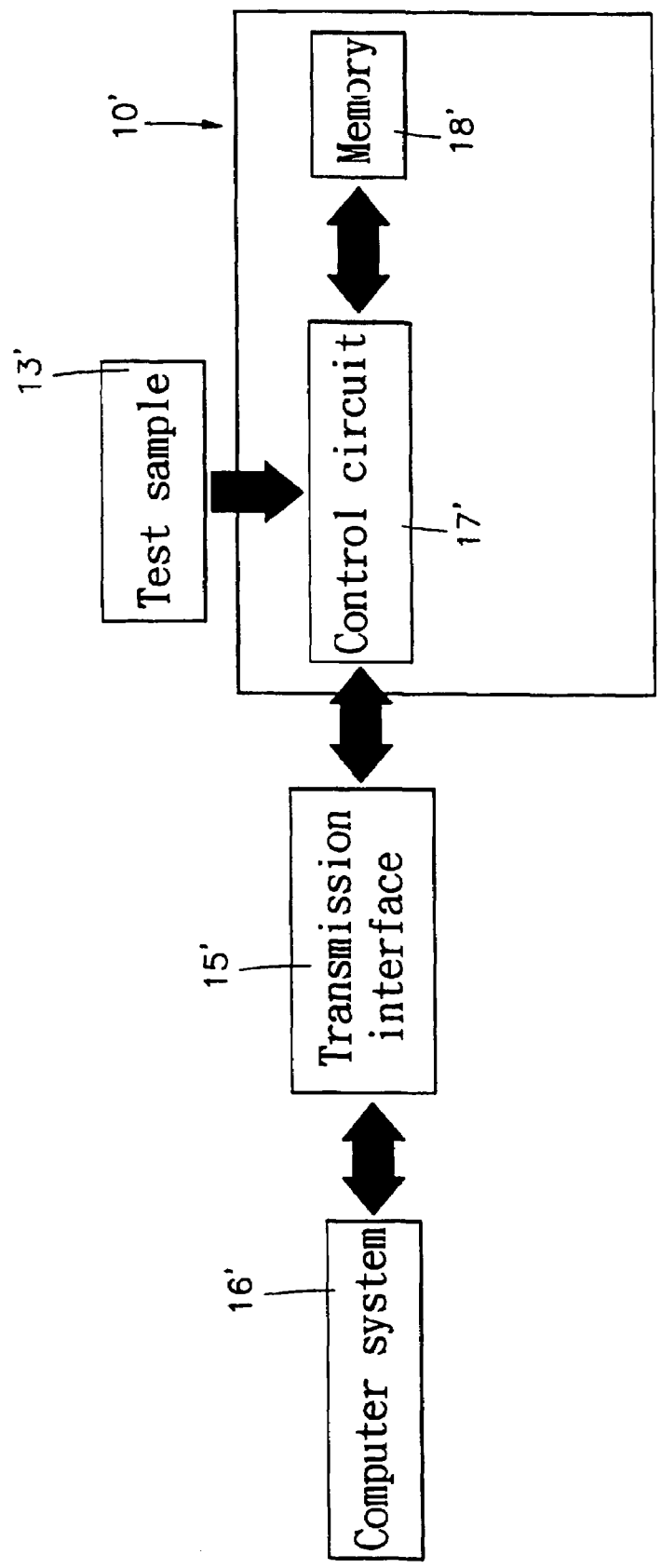
FIG. 2 is a system block diagram of the logic data analyzer according to the prior art.
Figure 3:
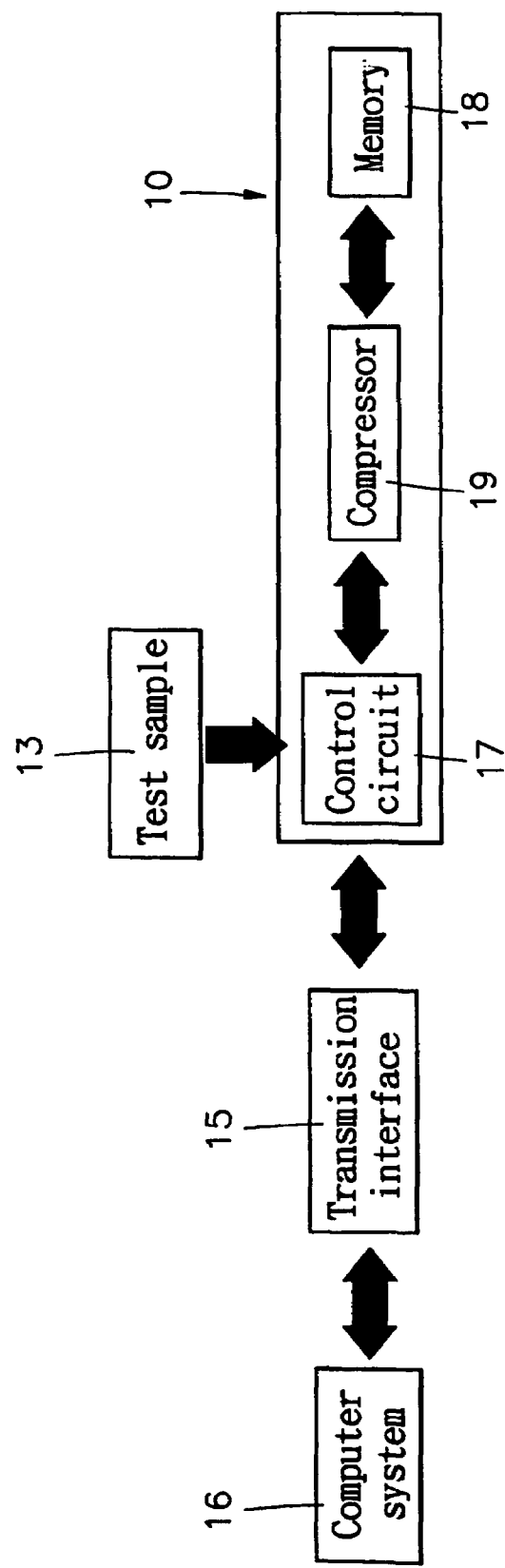
FIG. 3 is a system block diagram of a logic data analyzer according to the present invention.

Referring to FIG. 3, the logic analyzer main unit, referenced by 10, comprises a control circuit 17, a memory 18 (for example SRAM), and a compressor 19. When received the test data of the test sample 13, for example, a digital circuit, the control circuit 17 transmits the received test data to the compressor 19, which compresses the test data to reduce its size, so that the compressed test data can be stored in less space in the memory 18. When the memory space of the memory 18 used up (fully occupied by storage data), the control circuit 17 fetches the storage data from the memory 18, and then directly transmits the fetched data to the computer 16 through the transmission interface 15 for display on the display panel 161 of the computer 16. The control circuit 17 may control the compressor 19 to decompress the data fetched from the memory 18 before sending it to the computer 16.

Figure 4:
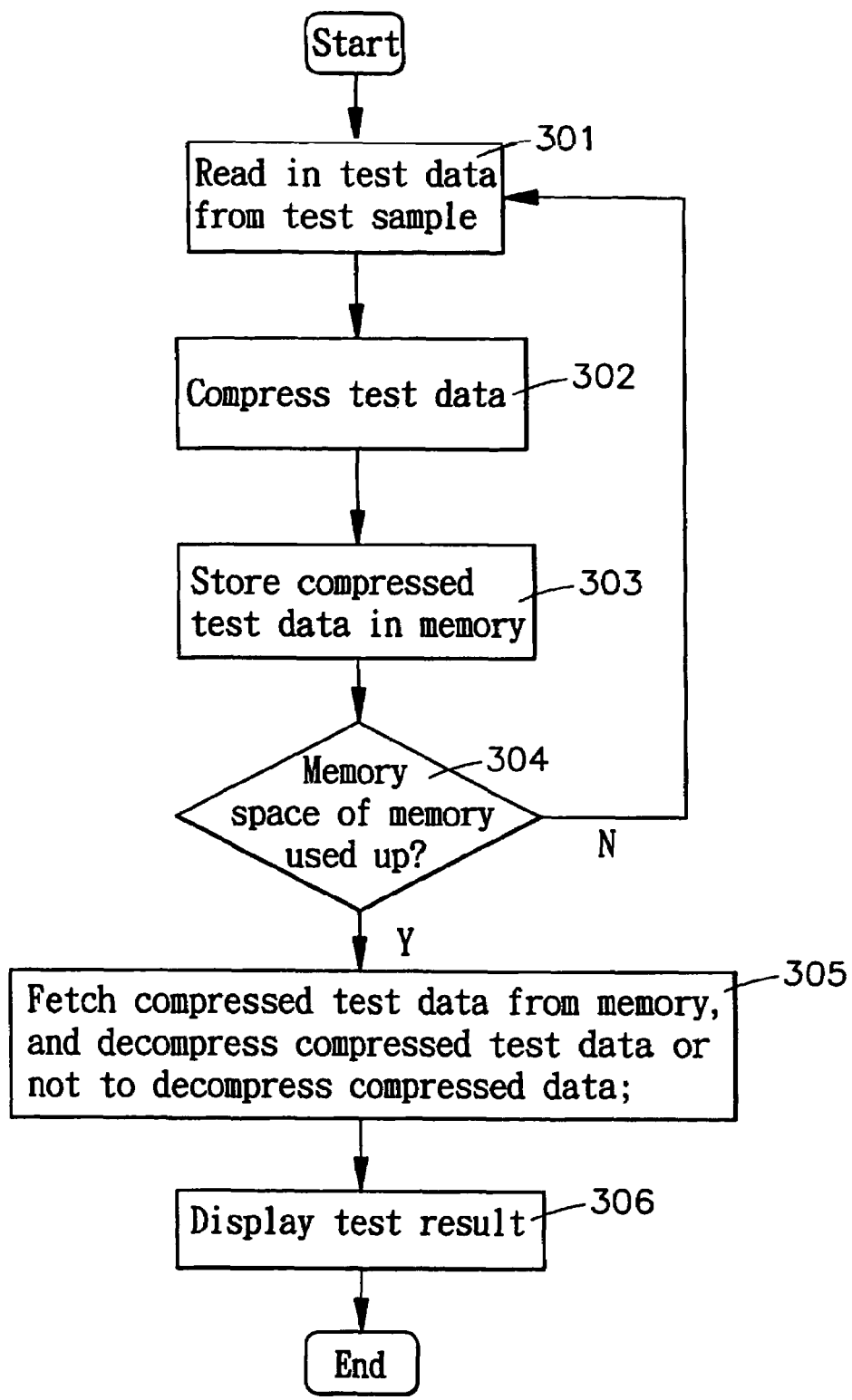
FIG. 4 is an operational flow chart of the present invention.

Referring to FIG. 4 and FIG. 3 again, the control circuit 17 works subject to the steps bellows:

(301) At first, read in the test data transmitted from the test sample 13 (the test data includes high/low potential status of every pin of the test sample 13 at a fixed time interval);
(302) Transmit the test data to the compressor 19, and then drives the compressor 19 to compress the test data, so as to reduce the size of the test data;
(303) Store the compressed test data in the memory 18;
(304) Determine if the memory space of the memory 18 has been used up (fully occupied) or not, and then proceed to step (305) if positive; or return to step (301) if negative;
(305) Fetch the compressed test data from the memory 18, and then drive the compressor 19 to decompress the compressed test data (the data decompression process may be eliminated);
(306) Transmit the fetched (or decompressed) test data through the transmission interface 15 to the computer 16 for display on the display panel 161 of the computer 16 for reference.

According to the aforesaid description, the test data obtained from the test sample is compressed to reduce the size, so that the compressed test data can be stored in less space in the memory 18. Therefore, the memory 18 can store more test data.

Figure 5:
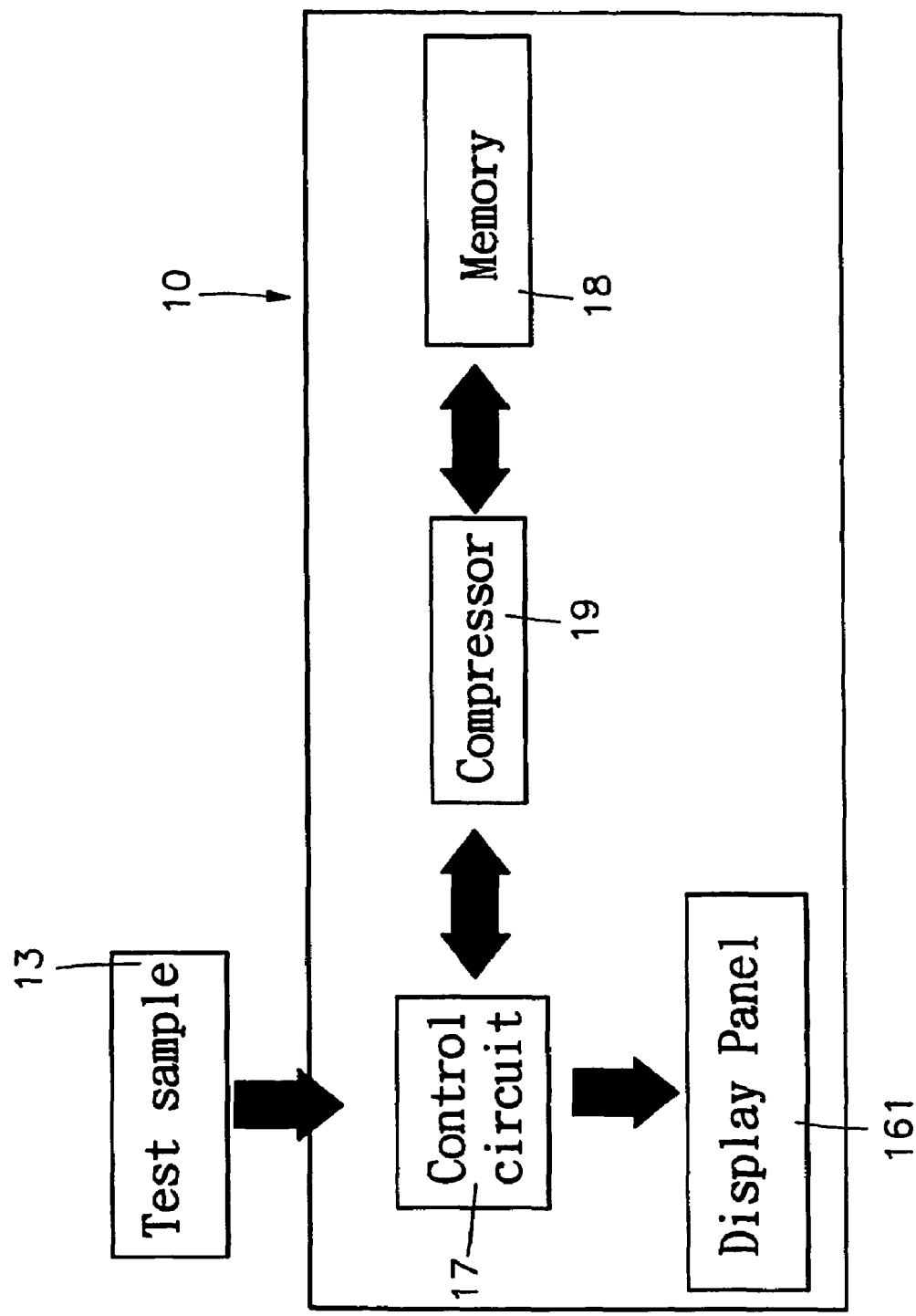
FIG. 5 is a system block diagram of an alternate form of the logic data analyzer according to the present invention.

FIG. 5 shows an alternate form of the present invention. According to this embodiment, the logic analyzer main unit 10 comprises a control circuit 17, a memory 18 (for example SRAM), a compressor 19, and a display panel 161. When received the test data from the test sample 13, the control circuit 17 transmits the received test data to the compressor 19, which compresses the test data to reduce its size, so that the compressed test data can be stored in less space in the memory 18. When the memory space of the memory 18 used up (fully occupied by storage data), the control circuit 17 fetches the storage data from the memory 18, and then drives the compressor 19 to decompress the data fetched from the memory 18, and then transmits the decompressed data to the display panel 161 for display.

A prototype of logic analyzer data processing method has been constructed with the features of the annexed drawings of FIGS. 3~5. The logic analyzer data processing method functions smoothly to provide all of the features discussed earlier.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A logic data analyzer for a test sample, comprising:
   a control circuit adapted for reading test data from said test sample;
   a memory, having a predetermined memory space, controlled by said control circuit to store said test data;
   a compressor electrically coupled between said control circuit and said memory to compress said test data for reducing a size thereof before storing in said memory, such that said compressed test data is stored in said memory space of said memory to maximize said memory space of said memory to be utilized for storing a complete series of said test data of said test sample; and
   a transmission interface electrically connected to said control circuit for connecting to a computer having a display means, wherein when said memory space of said memory is used up, said control circuit fetches said test data in said memory for directly transmitting said fetched test data to said computer through said transmission interface so as to display said fetched test data on said display means.

2. The logic data analyzer as recited in claim 1, wherein said control circuit controls said compressor for decompressing said fetched test data before transmitting said fetched test data to said computer.

3. The logic data analyzer as recited in claim 2, wherein said control circuit reads said test data in digital form from said test sample which is a digital circuit.

4. The logic data analyzer as recited in claim 3, wherein control circuit reads said test data including high/low potential status of every pin of said test sample at a fixed time interval.

5. The logic data analyzer as recited in claim 1, wherein said control circuit reads said test data in digital form from said test sample which is a digital circuit.

6. The logic data analyzer as recited in claim 5, wherein said control circuit reads said test data including high/low potential status of every pin of said test sample at a fixed time interval.

7. A logic data analyzer for a test sample, comprising:
   a control circuit adapted for reading test data from said test sample;
   a memory, having a predetermined memory space, controlled by said control circuit to store said test data;
   a compressor electrically coupled between said control circuit and said memory to compress said test data for reducing a size thereof before storing in said memory, such that said compressed test data is stored in said memory space of said memory to maximize said memory space of said memory to be utilized for storing a complete series of said test data of said test sample; and
   a display means electrically coupled to said compressor, wherein when said memory space of said memory is used up, said control circuit fetches said test data in said memory to display said fetched test data on said display panel.

8. The logic data analyzer as recited in claim 7, wherein said control circuit controls a decompressor for decompressing said fetched test data before displaying said fetched test data on said display means.

9. The logic data analyzer as recited in claim 8, wherein said control circuit reads said test data in digital form from said test sample which is a digital circuit.

10. The logic data analyzer as recited in claim 9, wherein said control circuit reads said test data including high/low potential status of every pin of said test sample at a fixed time interval.

11. The logic data analyzer as recited in claim 7, wherein said control circuit reads said test data in digital form from said test sample which is a digital circuit.

12. The logic data analyzer as recited in claim 11, wherein said control circuit reads said test data including high/low potential status of every pin of said test sample at a fixed time interval.

13. A method of processing test data from a test sample to a logic data analyzer which comprises a control circuit, a memory, and a compressor, comprising the steps of:
   (a) reading said test data from said test sample to said control circuit;
   (b) compressing said test data by said compressor to reduce a size of said test data;
   (c) storing said compressed test data in said memory to maximize a memory space of said memory to be utilized for storing a complete series of said test data of said test sample; and
   (d) displaying said test data on a display panel which is electrically coupled with said compressor, wherein when said memory space of said memory is used up, said control circuit fetches said test data in said memory to display said fetched test data on said display panel.

14. The method as recited in claim 13, wherein said control circuit is electrically connected to a computer via a transmission interface to transmit said test data to said computer so as to display said test data on said display means built-in with said computer when said memory space of said memory is used up.

15. The method as recited in claim 14, after the step (c), further comprising a step of decompressing said fetched test data before displaying said fetched test data on said display panel.

16. The method as recited in claim 15, in step (a), wherein said control circuit reads said test data in digital form from said test sample which is a digital circuit.

17. The method as recited in claim 16, in step (a), wherein said control circuit reads said test data including high/low potential status of every pin of said test sample at a fixed time interval.

18. The method as recited in claim 14, in step (a), wherein said control circuit reads said test data in digital form from said test sample which is a digital circuit.

19. The method as recited in claim 18, in step (a), wherein said control circuit reads said test data including high/low potential status of every pin of said test sample at a fixed time interval.

20. The method as recited in claim 13, after the step (c), further comprising a step of decompressing said fetched test data before displaying said fetched test data on said display panel.

21. The method as recited in claim 13, in step (a), wherein said control circuit reads said test data in digital form from said test sample which is a digital circuit.

22. The method as recited in claim 21, in step (a), wherein said control circuit reads said test data including high/low potential status of every pin of said test sample at a fixed time interval.

* * * * *